No. 12,754. REISSUED FEB. 25, 1908.

W. A. ALLEN.

TIRE COVER.

APPLICATION FILED JAN. 17, 1908.

WITNESSES

L. H. Gyte

W. E. Keir

INVENTOR

William A. Allen

BY

Howson and Howson

ATTORNEYS

UNITED STATES PATENT OFFICE.

WILLIAM A. ALLEN, OF NEW YORK, N. Y.

TIRE-COVER.

No. 12,754. Specification of Reissued Letters Patent. Reissued Feb. 25, 1908.

Original No. 828,701, dated August 14, 1906, Serial No. 298,880. Application for reissue filed January 17, 1908. Serial No. 411,375.

*To all whom it may concern:*

Be it known that I, WILLIAM A. ALLEN, a citizen of the United States of America, and a resident of the borough of Manhattan, in the city, county, and State of New York, have invented a new and Improved Tire-Cover, of which the following is a specification.

The purpose of the invention is to provide an effective cover for the tires of automobiles and other vehicles using rubber tires, which cover will fit snugly to the tire and conform to all parts thereof, said cover being so constructed that rain, snow, or hail will not beat in, but will shed therefrom as soon as received.

Another purpose of the invention is to construct a cover adjustable to different thicknesses of tires and which does not need lacing, the fastening devices employed being independent of each other and capable of expeditious and convenient manipulation.

The invention consists in the novel construction and combination of the several parts, as will be hereinafter fully set forth, and pointed out in the claims.

Reference is to be had to the accompanying drawings, forming a part of the specification, in which similar characters of reference indicate corresponding parts in all the figures.

Figure 1:
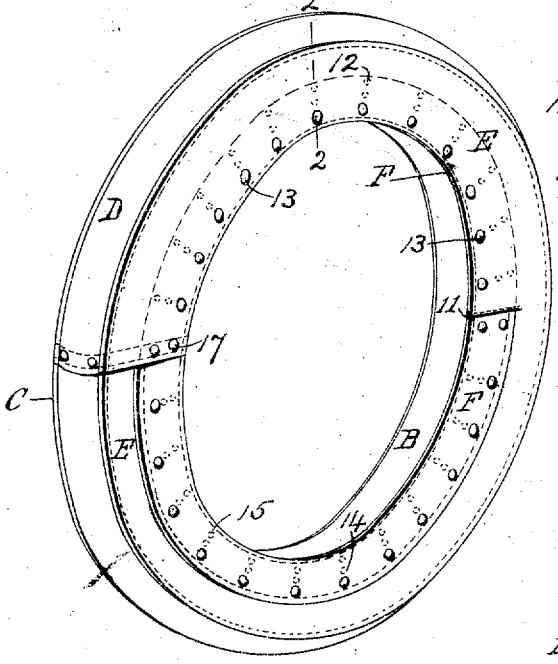
Figure 2:
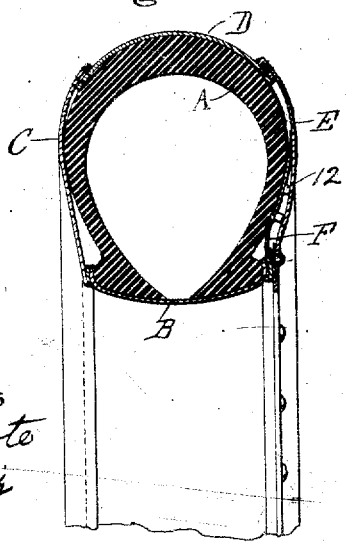
Figure 3:
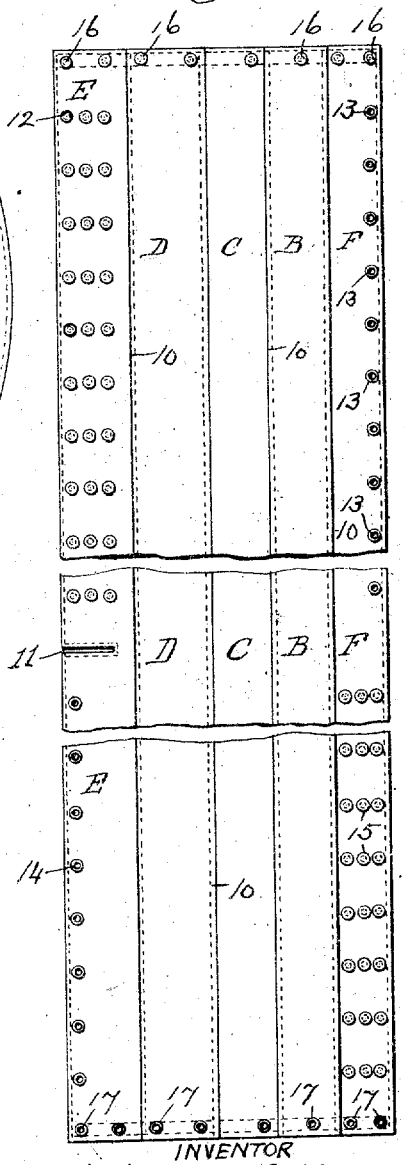

Figure 1 is a perspective view of the improved cover secured upon a tire. Fig. 2 is a transverse section taken practically on the line 2—2 of Fig. 1, and Fig. 3 is a broken plan view of the inner face of the cover laid flat.

The device is made from a strip of weatherproof material of any approved character and is in the form substantially of a parallelogram. It comprises five strips substantially parallel with each other and stitched together at their adjoining edges or equivalently secured. These strips consist of a strip B, which is adapted to cover the inner face of the tire A, a strip C, which covers one side face of the tire, a strip D, which covers the tread, together with a strip E, which covers the other side of the tire and extends to the adjacent edge of the inner strip B, and the fifth strip F is a flap which is adapted to engage with one of the side strips—the side strip E, for example. The strip E is provided about centrally between its ends with a transverse cut 11, the cut material being suitably protected by stitching or otherwise at its edges.

The strip E at one side of the cut 11 is provided with rows of studs 12, the rows being in transverse order and at suitable distances apart, and any desired number of studs may constitute a row. At corresponding points on the flap F a longitudinal row of sockets 13 are located, adapted to engage with any of the studs in the rows 12. The studs 12 and the sockets 13 constitute the two members of a separable button. At the opposite side of the cut 11 in the strip E a longitudinal series of socket members 14 is located, and at corresponding points in the flap F transverse rows of studs 15 are secured, adapted to be received by any of the sockets 14. Thus it will be observed that the studs of the separable buttons at one end of the cover are on the flap F, while the studs for the separable buttons at the opposite end of the cover are on the side strip E, and at one end of the cover studs 16 are secured, adapted to be received by sockets 17 at the opposite end of the cover, as is best shown in Fig. 3.

When the cover is placed on the tire A, as is shown in Figs. 1 and 2, the strip B conforms to the inner face of the tire, the strip C engages smoothly with one side face of the tire, the strip D engages with the tread of the tire, and the strip E engages with the opposite face. The flap F is made to lie between the outer face of the tire and the outer cover strip E for about one-half the circumference of the tire, while the remaining portion of the flap F lies outside of the side cover strip E, as is clearly shown in Fig. 1. Thus when the tire is placed so that the concealed portion of the flap F is uppermost and the exposed portion is at the lower portion of the tire, it is impossible for the weather to beat into the cover to reach the tire, even in the most severe storm, since the water will be shed equally well from both the upper and lower portions of the cover. The cover is secured in position by simply pressing the socket members of the separable buttons upon the stud members thereof, as is particularly shown in Figs. 1 and 2. No laces are employed for the improved cover, and the said cover is so constructed as to conform strictly to the contour of the tire, and by reason of the transverse rows of studs being employed in connection with a single longitudinal row of sockets of a separable button the cover may be made to fit tires which vary in depth or thickness and yet conform to the outline of the tire.

Having thus described my invention, I claim as new and desire to secure by Letters Patent:—

1. A covering for vehicle tires, constructed of a weather proof material consisting of connected substantially parallel strips, one for the inner face of the tire, one for each of the side faces of the same, one for the tread, and a flap connected with the inner facing strip, and adapted for lapping engagement with one of the side strips, one only of the parts thus lapped being transversely divided, and one portion of the flap being arranged to extend beneath said side strip and the other portion outside said side strip, and means for securing the flap to the side strip with which it engages.

2. A cover for vehicle tires, constructed of a weather-proof material consisting of connected substantially parallel strips, one for the inner face of the tire, one for each of the outer side faces, and a flap connected with the inner facing-strip, adapted for lapping engagement with a side strip, the said side strip which is to lap the flap section being transversely cut between its ends, one portion of the flap strip being carried beneath the said side strip and the other portion over the side strip, and means for securing the said flap to the side strip with which it engages and means for securing the ends of all the strips together.

3. A covering for vehicle tires constructed of a weather-proof material and consisting of connected parallel strips, one for the inner face of the tire, one for each of the outer side faces, one for the tread, and a flap connected with the inner facing strip, the side section which is to lap the flap section being provided with a transverse cut between its ends, stud sections of separable buttons arranged in multiple series in transverse rows and carried by one portion of the said flap section, and socket members for the said studs arranged in a longitudinal row and carried by the outer side section of the cover at the same end thereof, and duplicate stud and socket sections of separable buttons located at the opposite end portion of the cover but in reverse order, and means for attaching the ends of the cover together.

In testimony whereof I have signed my name to this specification, in the presence of two subscribing witnesses.

WM. A. ALLEN.

Witnesses:
L. H. GROTE.
HUBERT HOWSON.